(12) United States Patent
Ford et al.

(10) Patent No.: US 9,413,690 B2
(45) Date of Patent: Aug. 9, 2016

(54) SWITCH DEVICE

(75) Inventors: Anthony Michael Ford, Bristol (GB); James Tilbrook Corke, Herefordshire (GB); Neil Alexander Shute, Glocestershire (GB); Mark Owen Homewood, Herefordshire (GB)

(73) Assignee: Cray UK Limited, Reading (GB)

( * ) Notice: Subject to any disclaimer, the term of this patent is extended or adjusted under 35 U.S.C. 154(b) by 832 days.

(21) Appl. No.: 13/820,094

(22) PCT Filed: Aug. 31, 2011

(86) PCT No.: PCT/GB2011/051627
§ 371 (c)(1),
(2), (4) Date: May 13, 2013

(87) PCT Pub. No.: WO2012/028873
PCT Pub. Date: Mar. 8, 2012

(65) Prior Publication Data
US 2014/0146814 A1 May 29, 2014

(30) Foreign Application Priority Data

Sep. 1, 2010 (GB) .................................. 1014504.3

(51) Int. Cl.
*H05K 7/00* (2006.01)
*H04L 12/933* (2013.01)
*H04Q 1/14* (2006.01)

(52) U.S. Cl.
CPC ................ *H04L 49/10* (2013.01); *H04Q 1/145* (2013.01)

(58) Field of Classification Search
CPC .......... H05K 1/144; H05K 5/00; H04L 12/00; H04L 12/56
USPC ........ 361/760, 679.02, 679.36; 370/358, 379, 370/382, 388, 411, 430, 436; 439/64, 74, 439/660
See application file for complete search history.

(56) References Cited

U.S. PATENT DOCUMENTS

| 5,541,586 | A | | 7/1996 | Wise | |
|---|---|---|---|---|---|
| 5,784,369 | A | * | 7/1998 | Romiti | H04Q 11/08 370/358 |
| 5,859,718 | A | * | 1/1999 | Yamamoto | H04J 14/0227 370/430 |
| 5,949,778 | A | * | 9/1999 | Abu-Amara | H04L 12/5601 370/388 |
| 7,748,992 | B1 | * | 7/2010 | Wooley | G06F 13/409 439/660 |
| 2006/0221559 | A1 | * | 10/2006 | Campini | H05K 7/1461 361/679.36 |
| 2006/0223343 | A1 | * | 10/2006 | Campini | H05K 1/144 439/64 |

FOREIGN PATENT DOCUMENTS

EP 0649204 A1 4/1995
WO WO-03045072 A2 5/2003

\* cited by examiner

*Primary Examiner* — Xiaoliang Chen
(74) *Attorney, Agent, or Firm* — Craig J. Lervick; Larkin Hoffman Daly & Lindgren, Ltd.

(57) ABSTRACT

A switch device for use in telecommunications apparatus, the switch device comprising: a substantially planar substrate having first substantially planar face and an opposing second substantially planar face; a first plurality of ports mounted on the first face of the substrate, and having a first arrangement of locating pins which extend into the substrate from the first face towards the second face thereof; and a second plurality of ports mounted on the second face of the substrate, and having a second arrangement of locating pins which extend into the substrate from the second face towards the first face thereof, wherein the first arrangement of locating pins is offset with respect to the second arrangement of locating pins.

9 Claims, 3 Drawing Sheets

SWITCH DEVICE

The present invention relates to a switch device and, in particular, the present invention relates to a switch device which optimises provision of ports available for connection.

Rack assembly devices are commonly found in all areas of electronic equipment and in particular computers are commonly rack assembly devices. The principle of a rack assembly device, such as a computer, is to allow hardware to be configured densely whilst ensuring the device does not occupy excessive floorspace. Components, such as the motherboard or memory components for a computer, are typically provided as a chassis which can be inserted into the rack assembly device facilitating efficient assembly of the computer. The chassis is in some cases provided with a rigid frame providing support and compact storage for the components held therein. However, in other cases, the chassis is an arrangement of components which do not require a frame surround for rigidity. Standardisation of rack assembly devices has resulted in the development of rack units (U) which function as a standard subdivision of the storage space within a rack such that 1 U=44.4 mm (1.75 inches). In practice, each chassis is built slightly smaller than 1U, typically 43.7 mm in height, to enable each chassis to be inserted and removed from the rack without interfering with any adjacent chassis located in the rack.

As processing requirement and memory component capability has increased, each chassis has contained more functional hardware. The increase in functionality of the hardware has created a requirement of greater access to this functionality. In view of this, it has been necessary for each chassis to provide a greater amount of port access so that the hardware utilisation can be maximised. A known 24 port switch chassis 10 is shown in FIG. 1. As can be seen, the frame 11 of the chassis 10 is a rectangular box shape within which hardware, such as a switch device, is contained. On face 12, which is 1 U in height, the chassis 10 is provided with ports 13a-13x which provide electrical connection access to the hardware and which are arranged in two horizontal rows 14a and 14b. Each row 14a, 14b is provided with 12 ports 13a-l and 13m-x respectively. The ports are arranged such that any port 13a-l in row 14a is arranged vertically above a port 13m-x in row 14b with the ports 13a-x arranged so as to form three groups 16a, 16b and 16c each containing 8 ports 13a-d, m-p; 13e-h, q-t and 13i-l, u-x respectively. Single connector components are often available from connector manufacturers with multiple sockets to both reduce the cost of manufacture and enable double stacking of sockets onto a single printed circuit board (PCB). These can be described as port connector arrays and may provide multiple connectors in both width and/or height as viewed from face of the sockets. Chassis' having up to 44 ports, providing access to the hardware components, such as switch devices formed of printed circuit boards (PCBs), contained within the chassis frame, are now commonplace. However, as the numbers of ports provided have increased, the space available on the chassis for each port has decreased; making manufacture of the chassis more complex and the provision of adequate tolerance in the frame around each port array becomes more problematic. In addition, the decrease of space around each port means that the insertion of external connectors into the ports requires more dexterity from the person assembling the computer and may require excessive force to be used.

As well as these issues, further issues can arise in respect of the connection process itself within the chassis hardware itself. Typically port connector blocks are attached to the PCB substrate of the chassis using push-fit pins. These push fit pin connectors have small projecting legs that can be pushed into holes provided in the PCB substrate to provide electrical and mechanical contact. Each PCB must have a substrate which is sufficiently thick to ensure the legs of the push fit pins do not touch each other through the substrate. As each chassis is limited to 1 U height, and thus the thickness of the PCB substrate cannot be increased, the number of push pin connectors which can be supported by current chassis arrangements is limited.

The present invention seeks to address the problems of the prior art.

According to a first aspect of the invention there is provided a switch device for use in telecommunications apparatus, the switch device comprising: a substantially planar substrate having first substantially planar face and an opposing second substantially planar face; a first plurality of ports mounted on the first face of the substrate, and having a first arrangement of locating pins which extend into the substrate from the first face towards the second face thereof; and a second plurality of ports mounted on the second face of the substrate, and having a second arrangement of locating pins which extend into the substrate from the second face towards the first face thereof, wherein the first arrangement of locating pins is offset with respect to the second arrangement of locating pins.

Offsetting the locating pins of a first plurality of ports when mounted on a substrate from the locating pins of a second, opposing, plurality of ports mounted on a substrate, optimises the plurality of ports which can be mounted upon the substrate.

Preferably, the substrate is a printed circuit board, and the locating pins provide electrical and mechanical connections with the printed circuit board. A printed circuit board substrate enables the arrangement to be utilised in components such as, but not limited to, computer memory.

A flexible gasket may be arranged, at least partially, around the first plurality of ports, and wherein respective spring connectors are provided on the substrate for reception of each of the second arrangement of locating pins. Use of a flexible gasket will enable the minimisation of leakage of electromagnetic energy whilst facilitating acceptable manufacturing tolerances.

A gasket may be arranged, at least partially, around the first plurality of ports and/or around the second plurality of ports. The gasket arranged, at least partially, around the first plurality of ports may be a flexible gasket. The gasket arranged, at least partially, around the second plurality of ports may be a spring gasket arrangement. Use of a flexible gasket will enable the minimisation of leakage of electromagnetic energy whilst facilitating acceptable manufacturing tolerances. Use of a spring gasket will enable the minimisation of leakage of electromagnetic energy whilst also minimising the impact of the gasket upon the volume of the switch device.

Conveniently, the ports are arranged in predetermined groups, and the device may further comprise a plurality of indicators for each group, the indicators of a group being operable to show which of the ports in a group is active. The indicators may be light emitting diodes.

In one embodiment, the ports may be arranged in a matrix form having a second plurality of columns. Such a port arrangement enables maximisation of port provision on the switch device.

In one embodiment, the first and second pluralities of ports provide seventy two ports in total. Such an embodiment enables the provision of seventy two ports in a 1 U rack space.

According to a further aspect of the invention, there is provided a switch device for use in telecommunications apparatus, the switch device comprising a substantially planar substrate having first and second substantially planar faces to opposite sides thereof; a first group of eight ports mounted on the first face of the substrate in two rows of four, and having a first arrangement of locating pins which extend into the substrate from the first face towards the second face thereof; and a second group of four ports mounted on the second face of the substrate, and having a second arrangement of locating pins which extend into the substrate from the second face towards the first face thereof, wherein the first arrangement of locating pins is offset with respect to the second arrangement of locating pins. Conveniently the device may comprise six such first groups, and six such second groups. Such an embodiment enables the provision of seventy two ports in a 1 U rack space.

Switch devices embodying the present invention are applicable to networks operating at any speed, and, in particular, to 10 Gb Ethernet (10 GbE) networks.

An embodiment of the present invention will now be described, by way of example only, and with reference to the accompanying drawings, in which.

Figures 1, 2:
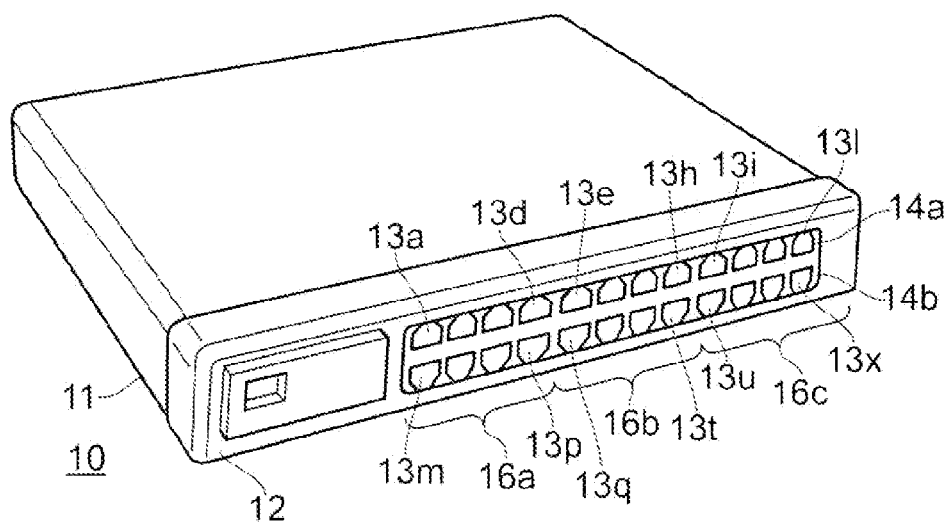
FIG. 1 illustrates a known 24 port switch chassis.
FIG. 2 illustrates a cross sectional view of hardware embodying the present invention.

FIG. 2 shows a cross sectional view of a switch device 30, which comprises a printed circuit board (PCB) substrate 31 having an upper face 31a and a lower face 31b. An upper port connector array 32 is provided on the upper face 31a of substrate 31. The upper port connector array 32 is provided with upper push pin connectors 35 which are inserted into the substrate 31 to provide electrical and mechanical contact. A lower port connector array 33 is provided on the lower face 31a of substrate 31. The lower port connector array 33 is provided with lower push pin connectors 37 which are inserted into the substrate 31 to provide electrical and mechanical contact. The lower push pin connectors 37 extend into substrate 31 beyond the extent of the upper push pin connectors 35. As can be seen, the lower port connector array 33 is offset linearly in the direction of arrow A from the upper port connector 32. By offsetting port connector array 32 from port connector arrays 33, the upper push fit pins 35 projecting from port connector array 32 are prevented from touching against the push pin connectors 37 through the substrate 31. Thus, the offsetting of port connector array 32 from port connector array 33 enables the optimisation of the number of ports mounted upon substrate 31 when substrate 31 has a thickness x whereby push pin connectors 35 and 37 each project a distance y wherein x<2y.

Figure 3:
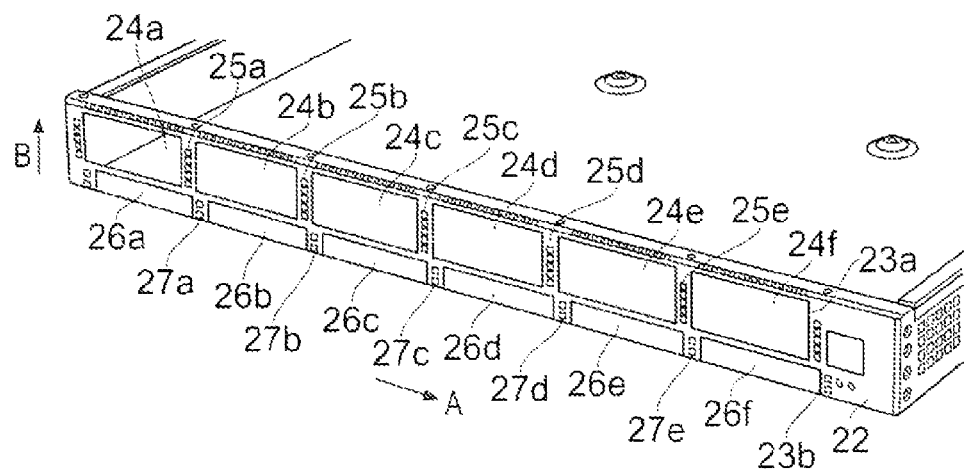
FIG. 3 illustrates a perspective view of a chassis frame embodying the present invention.

FIG. 3 illustrates a frame 20 which is of the dimensions required to fit a 1 U rack assembly area (not shown) and which can be used with hardware such as switch device 30 shown in FIG. 2 to form a chassis (not shown) for use in a rack assembly computer (not shown). The frame 20 is provided with an end face 22 which is provided with a first row 23a of a plurality of upper apertures, in this case six upper apertures 24a-24f which are arranged linearly and regularly spaced apart with a casing strut 25a-e provided between respective consecutive apertures 24a-f respectively. The end face 22 of the frame 20 is further provided with second row 23b of a plurality of lower apertures, in this case six lower apertures 26a-26f which are also arranged linearly and regularly spaced apart with a casing strut 27a-e provided between respective consecutive apertures 26a-f respectively. Rows 23a and 23b are in parallel with, but spaced apart from each other, however, within each row 23a, 23b the apertures are offset linearly, in this case in a horizontal direction indicated by arrow A, from one another. For example aperture 24a is offset linearly from aperture 26a and aperture 24b is offset linearly from aperture 26b such that casing strut 25a does not align with corresponding casing strut 27a, which in this case is equivalent to casing strut 25a not aligning in a vertical direction, in this case indicated with an arrow B with casing strut 27a.

Figure 4:
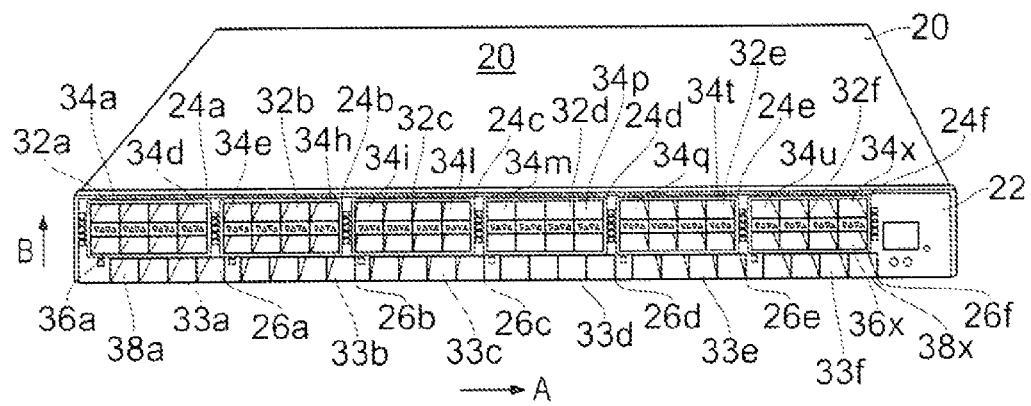
FIG. 4 illustrates a perspective view of a chassis embodying the present invention.

FIG. 4 shows a chassis comprising of a frame, for example frame 20 of FIG. 3, in which is mounted hardware similar to that shown in FIG. 2. Each upper aperture 24a-24f is provided with a port connector array 32a-f respectively whilst each lower aperture 26a-f is provided with a port connector array 33a-f respectively. With reference to upper array 32a, there is provided a first group of four ports 34a-34d which are arranged linearly such that they are arranged above, in parallel and aligned with a second group of four ports 36a-36d wherein port 34a is aligned vertically with port 36a. With reference to lower array 33a, there is provided a third group of four ports 38a-38d which are arranged below and in parallel with upper array 32a. However, lower array 33a is offset linearly, in this case in a horizontal direction indicated by arrow A, from upper array 32a. This arrangement can similarly be seen in respect of arrays 32b-f and 33b-f respectively.

By offsetting port connector arrays 32a-f from port connector arrays 33a-f, the projecting push pin connectors (not shown) of port connector arrays 32a-f are prevented from touching against the push pin connectors (not shown) of port connector arrays 33a-f through the PCB substrate (not shown). Thus, the offsetting of port connector arrays 32a-f from port connector arrays 33a-f enables the optimisation of the number of ports available for connection, which in this case is 72 ports.

Figure 5:
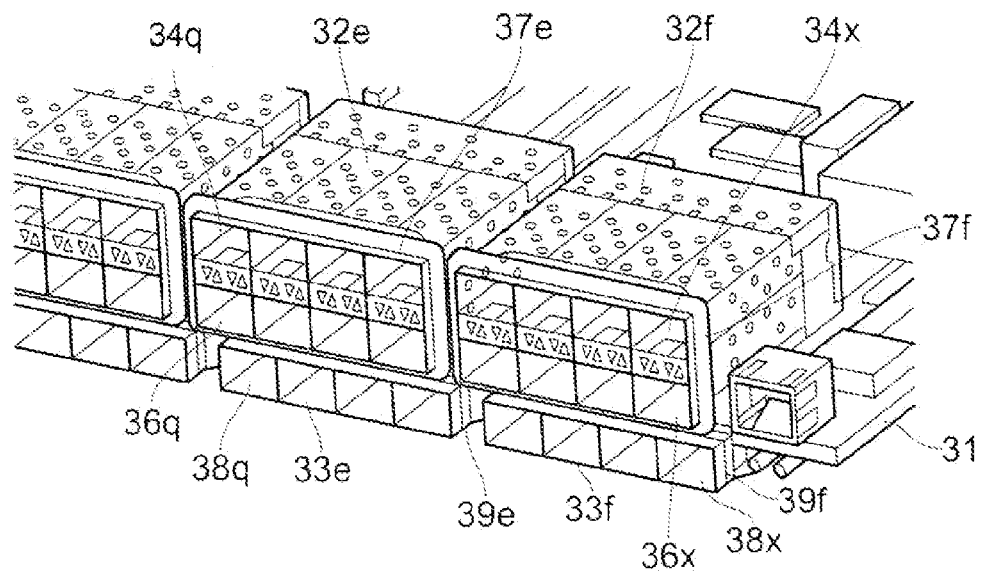
FIG. 5 illustrates a detail of a perspective view of hardware embodying the present invention.

When manufacturing the chassis 20, particularly when manufacturing the chassis 20 as part of a volume manufacture process, the apertures 24a-24f and 26a-26f must be provided with enough tolerance in terms of dimension to allow the port connector arrays 32a-f and 33a-f to be inserted through the apertures 24a-24f and 26a-26f respectively without undue force being applied. However, dimensional tolerance of the apertures 24a-24f and 26a-26f must not be too great as any gaps between the edge of an aperture and the edge of an array will enable high frequency energy to be emitted. Therefore, as can be seen in FIG. 5, which shows a detail of a chassis hardware 30 a collapsible gasket 37e is provided around upper port connector arrays 32e and a collapsible gasket 37f is provided around upper port connector array 32f. It will be appreciated, although not illustrated in FIG. 5, further upper port connector arrays 32n will similarly be provided with corresponding collapsible gaskets 37n. Each collapsible gasket 32e,f is a flexible conductive sheet which, when the hardware 30 is arranged within a frame such as frame 20 of FIG. 3, is disposed between the upper port connector arrays 32e,f and the corresponding upper apertures 24e, f whereby the collapsible gasket can be compressed and decompressed to accommodate any tolerance requirement. In addition, spring finger gaskets 39e, f are provided around port connector arrays 33e,f such that when the hardware 30 is arranged with in a frame, such as frame 20 of FIG. 3, they minimise the escape of electromagnetic energy from apertures 26e, f whilst also minimising space occupied by the gaskets 39e, f. In use, the spring finger gaskets 39e, f are securely mounted on the chassis 20 at apertures 26a-f such that they make tight and continuous contact with the edge of port connector arrays 33e,f providing a Faraday cage-type of electromagnetic interference shield.

Figure 6:
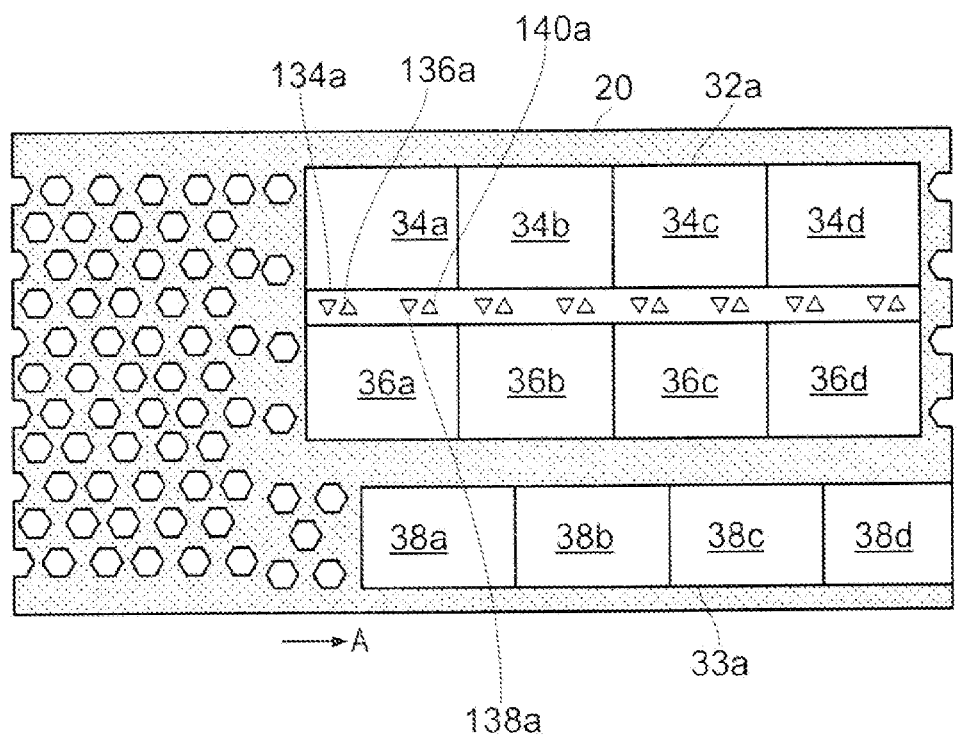
FIG. 6 illustrates a detail of an end view of a chassis embodying the present invention.

With reference to FIG. 6 there is shown a detail of a further embodiment of the chassis 20 provided with upper port array 32a and lower port array 33a which are offset linearly from one another in the direction of arrow A. As can be seen, in upper port array 32a, a display panel 40 is located between ports 34a-f and 36a-f.

With reference to ports 34a, 36a and 38a, four display lights, which in this case are light emitting diodes (LEDs) 134a, 136a, 138a and 140a are provided wherein LED 134a corresponds to port 34a, LED 136a corresponds to port 36a and LED 138a corresponds to port 38a. In this case LED 140a is spare and will not need to be used or illuminated to indicate activity on a port. When any one of a given row of ports is active, the corresponding LED will be illuminated.

Embodiments of the present invention are applicable to switch devices requiring any number of ports. One particular example embodiment, as shown in the accompanying drawings, provides seventy two ports in a 1 U rack space.

Switch devices embodying the present invention are applicable to networks operating at any speed, and, in particular, to 10 Gb Ethernet (10 GbE) networks.

Although aspects of the invention have been described with reference to the embodiment shown in the accompanying drawings, it is to be understood that the invention is not limited to the precise embodiment shown and that various changes and modifications may be effected without further inventive skill and effort. For example, the chassis 20 has been described with reference to FIG. 3, 4, 5 as being provided with hardware 30, mounted within a frame 20. However, it will be clearly understood that the chassis may be formed of hardware 30 which is of sufficient construct that no frame 20 is required. Furthermore, it will further be appreciated that whilst the hardware 30 has been described as a switch device within the context of a chassis for use in a rack assembly (not shown) the principle herein may be applied to any switch device comprising a substrate 31 onto which opposing port arrays 32, 34 are mounted using push pin connectors 35, 37 respectively.

The invention claimed is:

1. A switch device for use in telecommunications apparatus, the switch device comprising:
    a substantially planar substrate having first substantially planar face and an opposing second substantially planar face;
    a first plurality of ports mounted on the first face of the substrate, and having a first arrangement of locating pins which extend into the substrate from the first face towards the second face thereof; and
    a second plurality of ports mounted on the second face of the substrate, and having a second arrangement of locating pins which extend into the substrate from the second face towards the first face thereof,
    wherein the first arrangement of locating pins is offset with respect to the second arrangement of locating pins.

2. A device as claimed in claim 1, wherein the substrate is a printed circuit board, and the locating pins provide electrical and mechanical connections with the printed circuit board.

3. A device as claimed in claim 1, wherein a flexible gasket is arranged, at least partially, around the first plurality of ports, and wherein respective spring connectors are provided on the substrate for reception of each of the second arrangement of locating pins.

4. A device as claimed in claim 1, wherein the ports are arranged in predetermined groups, and the device further comprises a third plurality of indicators for each group, the indicators of a group being operable to show which of the ports in a group is active.

5. A device as claimed in claim 4, wherein the indicators are light emitting diodes.

6. A device as claimed in claim 1, wherein the ports are arranged in a matrix form having a second plurality of columns.

7. A device as claimed in claim 1, wherein the first and second pluralities of ports provide seventy two ports in total.

8. A switch device for use in telecommunications apparatus, the switch device comprising:
    a substantially planar substrate having first and second substantially planar faces to opposite sides thereof;
    a first group of eight ports mounted on the first face of the substrate in two rows of four, and having a first arrangement of locating pins which extend into the substrate from the first face towards the second face thereof, and
    a second group of four ports mounted on the second face of the substrate, and having a second arrangement of locating pins which extend into the substrate from the secondface towards the first face thereof,
    wherein the first arrangement of locating pins is offset with respect to the second arrangement of locating pins.

9. A device as claimed in claim 8, comprising six such first groups, and six such second groups.

\* \* \* \* \*